(No Model.) 3 Sheets—Sheet 1.
E. H. JOHNSON & R. LUNDELL.
SUPPLY SYSTEM FOR ELECTRIC RAILWAYS.
No. 523,165. Patented July 17, 1894.
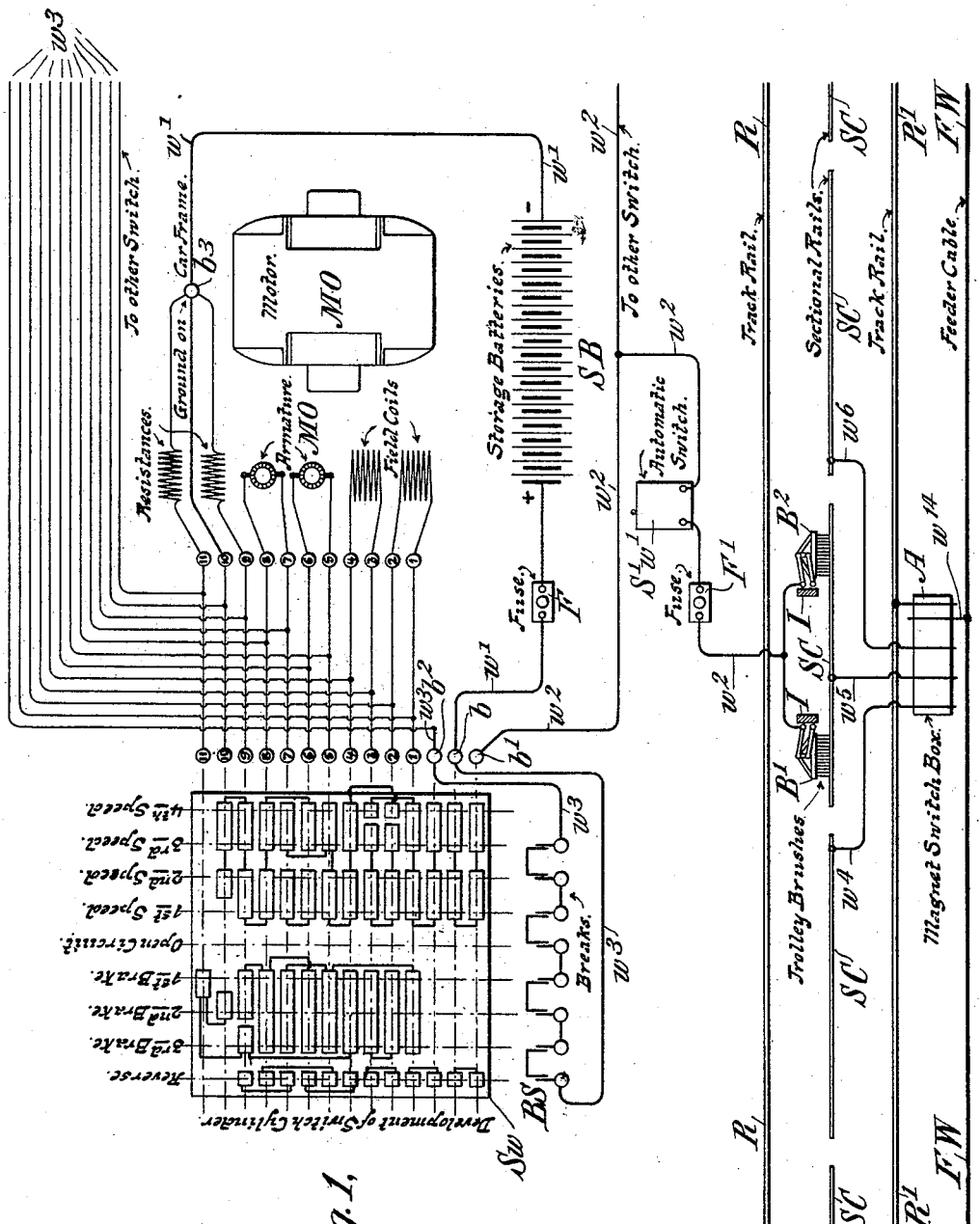
WITNESSES:
W. E. Mandelick
V. Lier
INVENTORS
Edward H. Johnson
Robert Lundell
BY
Charles J. Kintner
ATTORNEY (No Model.) 3 Sheets—Sheet 2.

E. H. JOHNSON & R. LUNDELL.
SUPPLY SYSTEM FOR ELECTRIC RAILWAYS.

No. 523,165. Patented July 17, 1894.

WITNESSES:
W. E. Mandelick.
V. Luer.

INVENTORS
Edward H. Johnson
Robert Lundell
BY
Charles J. Kintner
ATTORNEY (No Model.) 3 Sheets—Sheet 3.
E. H. JOHNSON & R. LUNDELL.
SUPPLY SYSTEM FOR ELECTRIC RAILWAYS.
No. 523,165. Patented July 17, 1894.
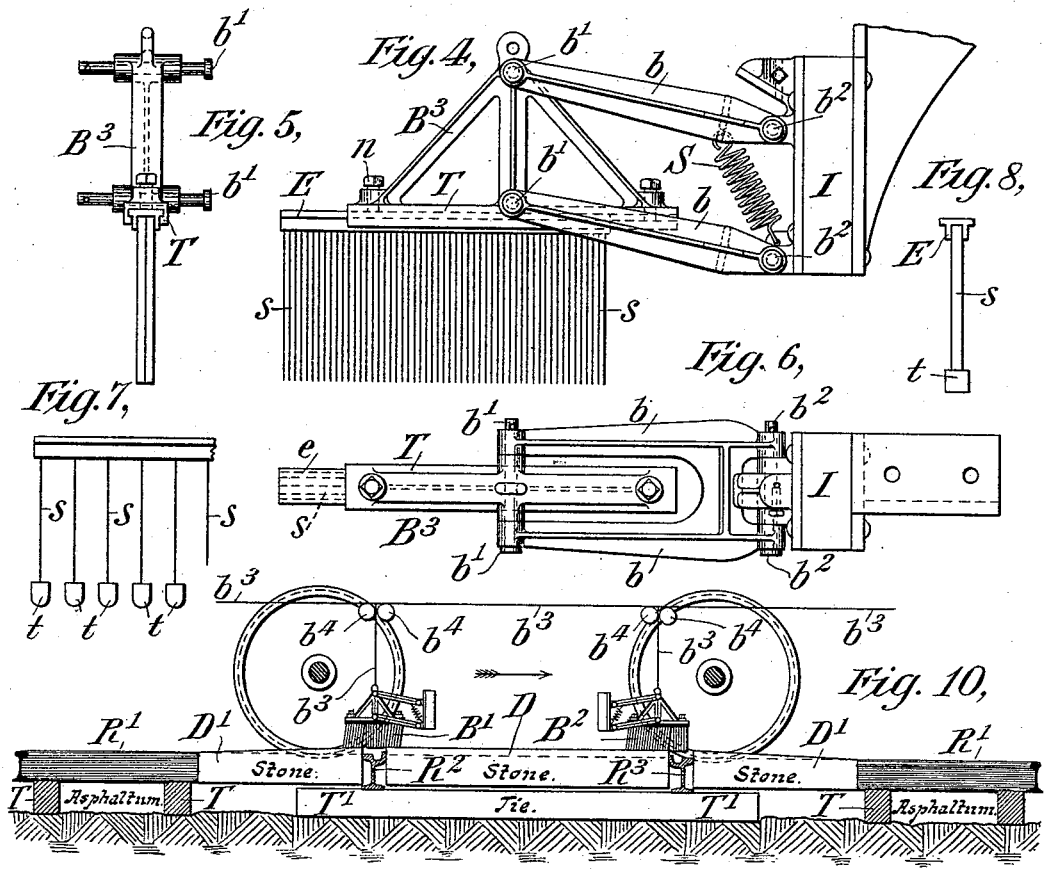
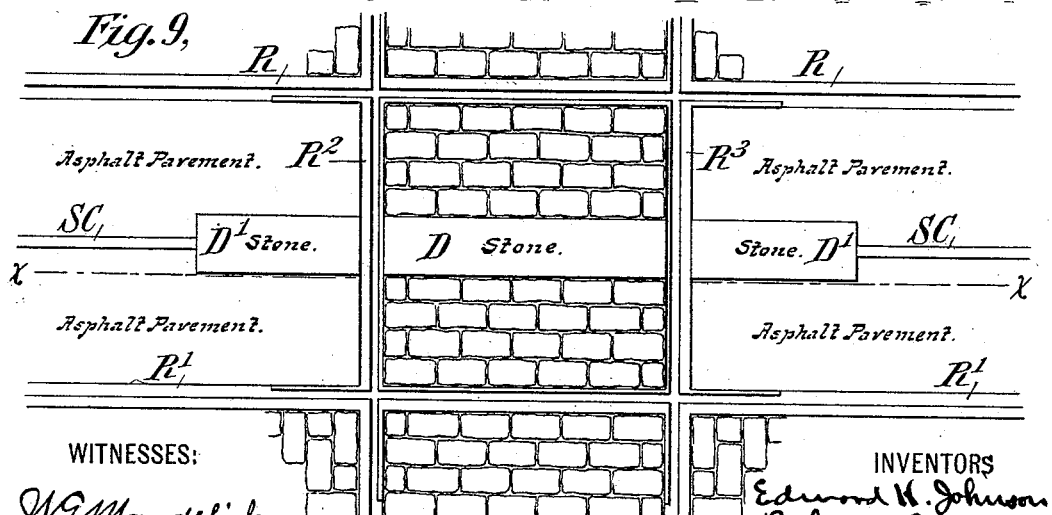
WITNESSES:
W. G. Mandelick
V. Lier
INVENTORS
Edward H. Johnson
Robert Lundell
BY
Charles J. Kintner
ATTORNEY

UNITED STATES PATENT OFFICE.

EDWARD H. JOHNSON, OF NEW YORK, AND ROBERT LUNDELL, OF BROOKLYN, ASSIGNORS TO THE JOHNSON SUBTROLLEY COMPANY, OF NEW YORK, N. Y.

SUPPLY SYSTEM FOR ELECTRIC RAILWAYS.

SPECIFICATION forming part of Letters Patent No. 523,165, dated July 17, 1894.

Application filed January 16, 1894. Serial No. 497,022. (No model.)

*To all whom it may concern:*

Be it known that we, EDWARD H. JOHNSON, residing at New York, in the county of New York, and ROBERT LUNDELL, residing at Brooklyn, in the county of Kings, State of New York, both citizens of the United States, have made a new and useful Improvement in Electric Railways, of which the following is a specification.

Our invention relates to improvements in that type of electric railways in which the propelling current is taken from exposed or bared sectional trolley conductors automatically connected, as a car or vehicle proceeds over the route, to an insulated current main in direct circuit connection with a dynamo electric machine or other source of electrical energy located at a power house and to this end it is directed particularly to improvements upon an invention disclosed in a prior application filed by us in the United States Patent Office on the 19th day of December, 1893, and bearing Serial No. 494,092.

In the application referred to we describe two sets of sectional trolley conductors situated side by side, one set located between the lines of tram rails and the other outside said lines of rails, together with circuit connections through one or more sliding contact brushes or trolleys, whereby the outer set is utilized with a source of electrical energy carried by a car or vehicle to actuate switch operating electro-magnets located in sets of three in water tight switch boxes, the circuit connections of which electro-magnets are connected in turn from an insulated current feeder or main to the second set of sectional trolley conductors, the latter being adapted to convey the current through one or more sliding contact brushes or trolleys to an electric motor on board the car or vehicle to be propelled.

The present invention has for its objects: first the adaptation and arrangement of circuits and circuit connections of an electrical railway system of the type named in such manner as to avoid current leakage from either the portable or stationary source of current supply when a car or vehicle is standing still: second to provide means for preventing the short circuiting of the battery or portable source of current supply carried by the moving car or vehicle: third to provide means for permitting electrically propelled tram cars to cross other lines of tram rails without endangering in any manner the circuit connections or operations of the apparatus in either system of such crossing tram ways: fourth to prevent current leakage from the live sectional trolley conductors immediately under the propelled car or vehicle to adjacent exposed sectional trolley conductors immediately in advance or in the rear of the car: fifth to render the switch actuating magnets absolutely certain of action and to prevent all arcing at the circuit making and breaking contact points thereof and also to prevent any operation or action of said parts except for actual working service thereby greatly decreasing all unnecessary wear and tear upon this portion of the system: sixth to increase the efficiency of the sliding contact brushes or trolleys and to so construct them that flat sectional trolley conductors may be used, their upper surfaces being preferably flush with the surface of the road-bed: seventh to provide a complete system in which absolute safety to the apparatus, to persons and animals is assured. These several objects are secured by the apparatus hereinafter described, the features we deem as novel with us being particularly specified in the claims which follow this specification.

Referring now to the drawings: Figure 1 is a diagrammatic view illustrating our improvement as applicable to a single line of trolley conductors, together with the circuits and circuit connections of the entire apparatus carried by a propelled car or vehicle, the motor, motor circuits and switch actuating apparatus therefor being similar to that disclosed in a prior patent granted to Robert Lundell on the 24th day of October, 1893, and numbered 507,144, to which patent reference is had for a correct understanding of the circuit connections and operation of the switching mechanism in connection with the motor. Fig. 2 is a diagrammatic view illustrating the circuit connections to one set of electro-magnets located in a single switch box parallel with the road-bed, said magnets being adapted to control the current supply to three sectional trolley conductors in sequence in the same general manner as do the corresponding electro-magnets described in our prior application above referred to. Fig. 3 is a diagrammatic view similar to Fig. 2 but illustrating additional safety circuits for preventing current leakage from active or live sectional trolley conductors under a car or vehicle to like exposed sectional conductors immediately in advance or in the rear of the car. Fig. 4 is a side elevational view of our improved form of sliding contact brush or trolley and its attached parts. Fig. 5 is an end elevational view as seen looking at pin 4 from left to right. Fig. 6 is a plan view of the same parts as seen looking at Fig. 4 from the top toward the bottom of the drawing. Fig. 8 is a partial side elevational view of a modified form of our improved sliding contact brush or trolley. Fig. 8 is an end elevational view of the same part as seen looking at Fig. 7 from left to right. Fig. 9 is a plan view of a road-bed illustrating two crossing tramways, one of which is provided with our improved means for preventing electrical crosses between two lines of rails. Fig. 10 is a longitudinal sectional view of the same as taken on the line $x$—$x$, Fig. 9.

Referring now to the drawings in detail in all of which like letters of reference represent like parts wherever used. $Sw$ and BS represent, in conjunction, a controlling switch and MO an electric motor on board of a car or vehicle to be propelled, said motor being provided with two sets of field magnet coils and two armatures and circuit connections between the two armatures, the field coils and the switch in substantially the same manner as disclosed in patent to Lundell above referred to; SB being a storage battery, F and F' fuses and S' $w'$ an electro-magnetic automatic over-load or safety switch, such over-load switches being well known in the art of electric lighting.

$w'$, $w^2$ and $w^3$ are conductors running from the storage battery and the motor to two sliding contact brushes or trolleys B' B$^2$ supported pivotally upon arms or bars I beneath the body of the car.

All of the parts so far described are carried by the car or vehicle, the circuits being earthed through the frame of the car, the car wheels and the tram rails R R'.

SC, SC, SC are sectional trolley conductors having their upper surfaces preferably flat and flush with the road-bed and embedded in asphalt in the same manner as are the like parts described in our prior application above referred to.

A represents one of the switch boxes containing three sets of electro-magnets M' M$^2$, M$^3$ M$^4$, and M$^5$ M$^6$, see Figs. 2 and 3.

$w^4$, $w^5$ and $w^6$ are insulated conductors connected at their outer ends to successive sectional trolley conductors SC, SC, SC and at their inner ends to the normally open low resistance coils of the electro-magnets M', M$^3$ M$^5$ and in turn through high resistance coils M$^2$, M$^4$, M$^6$ upon the same electro-magnet cores, the free ends of said high resistance coils being connected in turn to armature levers P, P' and P$^2$ which are in like manner connected by conductors $w^6$, $w^3$ and rheostats R$h'$, R$h^2$, R$h^3$ and by additional conductors $w^7$ to one of the lines of tram rails R', all of said parts being connected in series relation.

FW is the insulated feeder cable connected at each switch box by conductor $w^{14}$ to normally open contacts L, L', L$^2$ and to the low resistance coils of the working circuit electro-magnets M', M$^3$, M$^5$.

Referring now to Figs. 4, 5 and 6 for a description of our improved sliding contact brush or trolley: I is a bar or support for said brush bolted beneath the frame of the car, and $b$, $b$ are pairs of pivoted arms secured thereto by pins $b^2$ $b^2$. To the outer end of said arms is secured, by a corresponding pair of pins $b'$ $b'$, a brush support B$^3$; S being a strong spiral spring secured at one end to the upper pair of said arms and at the other end to the bar I so as to give a yielding downward pressure to the arms and the supported brush. In the lower side of this brush support B$^3$ is a T-shaped groove into which the brush which consists of a head E and stiff flat steel springs $s$ may be slid longitudinally; $n$, $n$ being set screws for firmly securing said brush head and brush in place at any desired position. With such an arrangement it is apparent that the brush proper may be detached at any time for repairs or for replacing a new brush. We prefer to make this brush by casting or otherwise securing flat steel springs $s$ in the brush head E at sufficient distances apart so that they may be comparatively independent of each other, their width being greater than their thickness and they located in pairs side by side as shown in Fig. 5. With such an arrangement of spring contacts we are enabled to do away with the grooved sectional trolley conductors disclosed in our prior application, the nature of the brush as a whole being such as to prevent spreading of the contacting portions. In Figs. 7 and 8 we have illustrated a modified form of this brush in which rounded metallic shoes $t$ are secured to the lower ends of the springs $s$, the object being to afford more efficient wearing and contact surfaces to the lower ends of the springs.

In Figs. 9 and 10 we have illustrated in plan and sectional views our improved arrangement for permitting one line of tram cars to cross that of another without interference of the electrical circuits. R$^2$, R$^3$ represent one line of tram rails, and R R' represent a second line of such rails crossing the first set at right angles and provided with sectional trolley conductors SC and our improved means of effecting the result sought. D, D', D' represent sections of stone or equivalent hard insulating material embedded in the road-bed in alignment with the sectional trolley conductors SC, SC, the sections D' D' being slightly inclined in opposite directions so that their inner ends, together with middle section D, are slightly above the crossing line of rails R² R³, the arrangement being such that the sliding contact brushes or trolleys B' B² will ride up the incline of the section D' when the car is moving in either direction as shown by the arrow so that the brushes will bridge the crossing line of rails R² R³ as clearly shown in Fig. 10 thereby avoiding any possibility of short circuits to the apparatus of either system. The brushes may be raised also, if preferred, by hand through mechanism located at either end of the car, the cord or rope $b^3$ being attached thereto and passing over pulleys $b^4$ $b^4$.

The operation of the apparatus is as follows, referring first to Figs. 1 and 2. In both of these figures of the drawings a car is supposed to be standing with the sliding contact brushes or trolleys B' B² both on that trolley section SC which is connected directly to the switch actuating magnet coils M³ M⁴, rheostat R$h^2$ and tram rail R' all in series relation and hence to earth. In Fig. 1 the switch Sw BS is shown in the position of "open circuit" so that all of the circuits to both the storage battery SB and the sectional trolley conductor are ruptured and hence no current can flow. All of the circuits are therefore "dead." In Fig. 2, however, suppose the switch Sw BS (Fig. 1) to be turned by the motor-man to the position indicated as "first speed." A small current flows therefore from the storage battery SB, which has, it should be noted, substantially the same voltage as the power house generator, by conductor $w$, switch contacts, conductor $w^2$, automatic over-load or safety switch S' $w'$, conductor $w^2$, sliding contact brushes or trolleys B' B², sectional trolley conductor SC, conductor $w^5$, low resistance coil M³ of few convolutions, high resistance coil M⁴ of relatively many convolutions, conductor $w^8$, rheostat R$h^2$, conductor $w^7$, all in series relation, to tram rail R' through the earth to the other tram rail R, thence by the car wheels and frame to binding post $b^3$ (see Fig. 1) and conductor $w$ to the other pole of the battery. This instantly energizes the core of the compound magnet M³ M⁴ and causes its armature lever to be lifted against the opposing pull of a spring or gravity until the movable contacts $p'$ close against the fixed contacts L' thereby closing a new circuit from the current feeder or main FW. The shunt or high resistance coil M⁴ is therefore cut out or short circuited and this it will be observed without interrupting any circuit, thus avoiding any arcing at the contacts $p'$ L'. The armature lever P' is now held up by the magnetizing effect of the low resistance coil M³ of few convolutions due to a current of larger ampère capacity flowing from the power house generator as follows: by current feeder or main FW, conductor $w^{14}$, contacts L' $p'$, low resistance coil M³ conductor $w^5$, sectional trolley conductor SC, brushes B' B², conductor $w^2$ (see Fig. 1) fuse F', automatic over-load switch S' $w'$, conductor $w^2$, binding post $b'$, switch Sw BS and those conductors $w^3$ which are now connected through the switch contact plates in the position "first speed," thence through such conductors $w^3$ as are connected to the armature and field magnet coils for giving first speed and finally by binding post $b^3$ to car frame, wheels, tram rail R and by earth or return conductor to the other pole of the power house generator. This causes the car to advance under first speed of motor MO. It will be apparent that a small proportion of the current will flow in derived circuit from the feeder through contact points L' $p'$ by way of the armature lever P, conductor $w^8$, rheostat R$h^2$, conductor $w^7$ and tram rail R' to earth and back to the generator but this leakage is immaterial. As the front brush B² advances it ultimately spans the space between the ends of the two adjacent sectional trolley conductors thereby actuating the switch controlled by the magnet M⁵ M⁶ from the next section in the same manner as just described in relation to the switch controlled by magnet M³ M⁴. When the rear brush leaves the front end of the same section the armature lever P' drops back to normal position.

In Fig. 3 we have illustrated our improved manner of preventing the current from leaking or creeping forward or backward from live trolley conductors beneath the car to adjacent exposed conductors in front or rear thereof. In this figure of the drawings the circuits, circuit connections and all of the operative parts are identically the same as shown in Fig. 2 except that additional or safety low resistance shunt circuits $w^9$, $w^9$, $w^9$ are provided which normally shunt the rheostats or high resistance coils R$h'$, R$h^2$ and R$h^3$, said shunt circuits being connected permanently at their inner ends to the conductor $w^7$ between the rheostats and earth and at their outer ends to fixed contact stops L³, L⁴ and L⁵ having normal circuit connection with movable contacts $p'$, $p^4$, $p^5$ carried on the under sides of the armature levers P P' and P². These safety shunts prevent leakage in the following manner. Referring first to Fig. 2. Suppose that upon a rainy day the adjacent ends of two exposed sectional trolley conductors nearest brush B² are covered with water. It is possible under such a condition that a small fraction of the current might creep, or leak forward some sections in advance, the nearer such water resistance approximates that of the total series resistance of the nearest energized switch magnet. Consequently a person or animal might receive a shock. With this arrangement illustrated in Fig. 3, however this is utterly impossible inasmuch as all of the dead or exposed sectional trolley conductors are connected directly to earth by the shunt circuits $w^9$ which are of very much lower resistance than are the circuits containing the rheostat or resistance coils $Rh'$, $Rh^2$, $Rh^3$, &c. When, however, the trolley brush $B^2$ rides on to a sectional trolley conductor SC the shunt circuit $w^9$ is immediately interrupted as is seen at $L^4 p^4$, the armature $P'$ being now in its upper position.

We do not limit ourselves to the particular means herein shown and described for accomplishing the several results sought and attained.

We illustrate and describe safety cut out mechanism in the nature of fuses F F' and a safety or over-load switching apparatus $S'$ $w'$ which will automatically rupture the circuit for abnormal current flow, thereby preventing damage to the storage battery and its connections; and also a safety crossing apparatus, and our claims to these safety devices as and for the purposes named are to be construed as of the most generic nature. We believe also that it is broadly new with us to provide a storage battery, preferably of limited current capacity, for propelling vehicles over road-ways and other places which would otherwise require expensive construction and to so combine this storage battery with circuits and circuit operating mechanism in connection with a series of sectional conductors, an insulated current feeder or main and switch actuating electro-magnets that the battery may be utilized for controlling the switches or propelling the vehicle at will, and our claims are also generic as to these features.

We are aware that we are not the first to combine a stationary generator, an insulated feeder or main and sectional trolley conductors with a propelling motor and a storage battery located on board a car, whereby the car may be propelled at will by currents from either the stationary or the portable generator, and we make no claim to this generic feature.

Having thus described our invention, what we claim, and desire to secure by Letters Patent of the United States, is—

1. In an electric railway system an insulated current feeder or main, a series of sectional trolley conductors connected each through a low and a high resistance switch magnet coil and a rheostat all in series relation to earth, in combination with normally open low resistance circuits connected to the feeder and the sectional trolley conductors and circuit connections whereby the switches are first actuated by the high resistance magnets and afterward held closed by the low resistance magnets.

2. In an electric railway system an insulated current feeder or main, a series of sectional trolley conductors connected each through a high resistance switch magnet coil and a rheostat to earth, in combination with normally open low resistance circuits connected to the feeder and the sectional trolley conductors and circuit connections whereby the switches are first actuated by the high resistance magnets, the low resistance circuits closed and the high resistance magnets simultaneously short circuited or shunted.

3. In an electric railway system an insulated current feeder or main, a series of sectional trolley conductors connected each through an electro-magnet of many convolutions and a normally closed low resistance circuit to earth, in combination with a high resistance circuit including a rheostat connected to the terminal of each of said magnets and also to earth, and circuit connections whereby when circuit is closed through the high resistance coils the aforesaid low resistance circuits will be closed and the low resistance earthed circuit simultaneously ruptured.

4. In an electric railway system an insulated current feeder or main, a series of sectional trolley conductors connected each to earth through two electro-magnet coils, one of few and the other of relatively many convolutions and a rheostat all in series relation, normally open low resistance circuits connected to the feeder or main and the sectional conductors; in combination with shunt circuits around the rheostats connected to earth and to switch contacts which are ruptured when the switching armatures are actuated.

5. In an electric railway system a series of sectional trolley conductors each connected through a permanently closed conductor to earth or a common return conductor, in combination with a shunt conductor of lower resistance around a portion of each of said permanently closed conductors and means for automatically rupturing said shunts as the sectional conductors are in sequence made active or alive.

6. In an electric railway system an insulated current feeder or main, a series of sectional trolley conductors provided with means for connecting them in sequence to the current main; a stationary source of current supply connected to the main, a second or portable source of current supply and a propelling electric motor carried by a car or vehicle to be propelled, switching mechanism whereby the motor may receive its current supply from the stationary or the portable source of current supply at the will of the motor-man and circuit interrupting devices carried on the car whereby all of the accessible conductors and connected parts carried by and immediately under the car may be absolutely disconnected.

7. In an electric railway system a car or vehicle carrying a propelling motor and a storage battery having circuit connections through stationary conductors near the road bed for charging the storage battery in combination with automatic circuit interrupting devices located in circuit between the storage battery and the stationary conductors adapted to rupture the battery circuit for abnormal current conditions.

8. In an electric railway system two crossing lines of tram rails located in substantially the same horizontal plane, one or more lines of trolley conductors embedded in the road bed and discontinued at the crossing, in combination with one or more bridges of insulating material located in alignment with the trolley conductors said bridges being secured between and on opposite sides of the crossing line of rails and adapted to lift or carry the conducting contact brushes above the crossing line of the tram rails and to wholly disconnect the electrical connections between the current feeder or main and the propelling motor carried by the vehicle during the entire time of crossing.

9. Two crossing lines of tram rails located in substantially the same horizontal plane and provided one or both with exposed sectional trolley conductors which are discontinued at the crossing in combination with insulating bridges one for each line of tram rails, said insulating bridges extending between the lines of rails and for short distances on each side thereof and adapted to cause the trolleys or contacting brushes to slide over or above the crossing line of tram rails during the entire time that the propelled vehicle is passing the crossing.

10. A sliding contact brush detachably secured to a brush support having pivoted connection through a cross bar or standard with the body of a car or vehicle, in combination with a spring connecting the brush support and its sustaining standard whereby the brush is given positive downward pressure against the trolley conductor as the car advances.

In testimony whereof we have hereunto subscribed our names this 13th day of January, 1894.

EDWARD H. JOHNSON.
ROBERT LUNDELL.

Witnesses:
C. J. KINTNER,
M. M. ROBINSON.